Feb. 1, 1927.  
C. A. WOLFE  
TIRE  
Filed July 17, 1923  
1,616,293
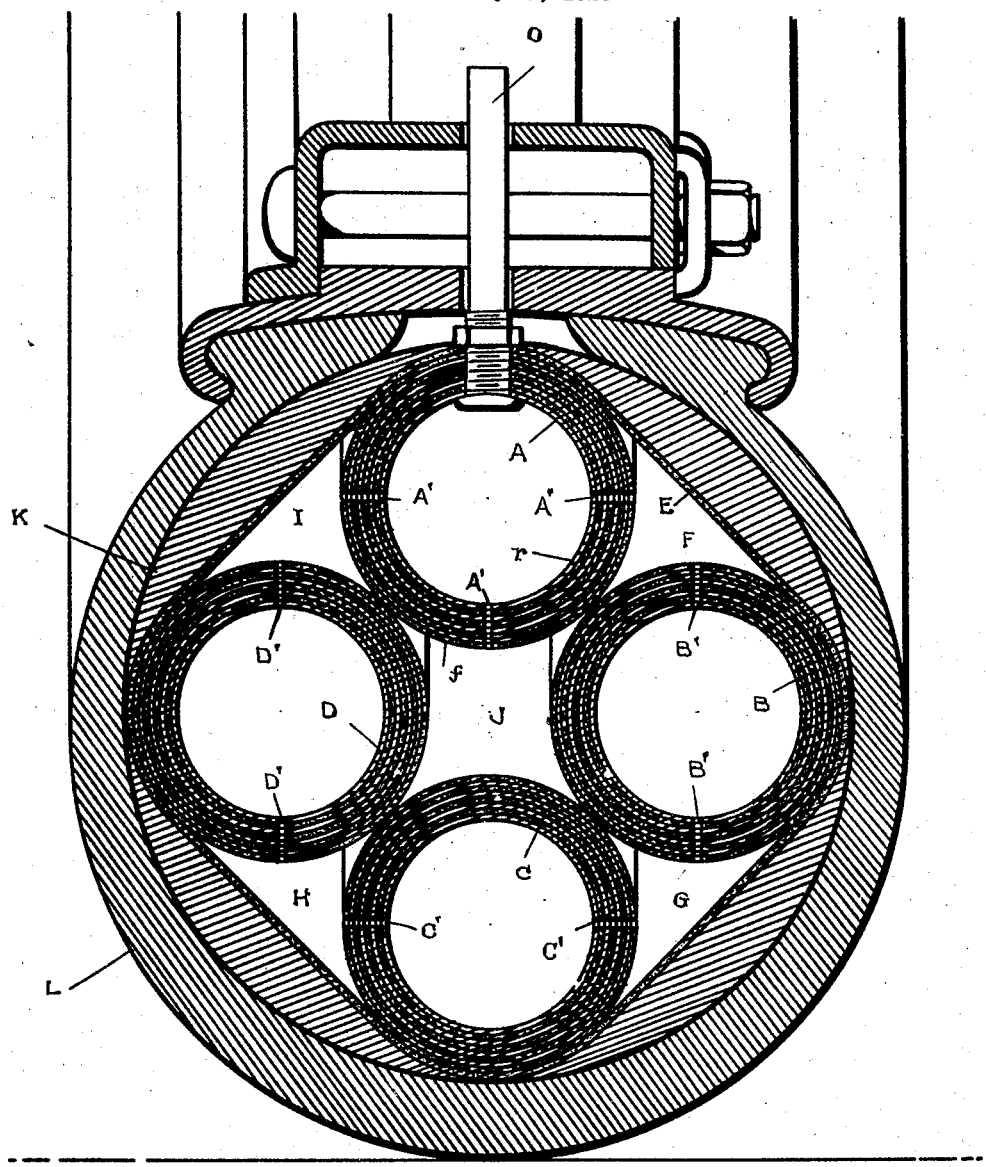
Inventor  
CHARLES A. WOLFE  
By Ogle R. Singleton.  
Attorney

UNITED STATES PATENT OFFICE.

CHARLES A. WOLFE, OF LEBANON, PENNSYLVANIA.

TIRE.

Application filed July 17, 1923. Serial No. 652,125.

My invention consists in a new and useful improvement in vehicle tires and is designed to provide an inner tire which is composed of several tubes constructed of alternate layers of rubber and fabric which have both resistance to shock and resiliency. I depend upon the resilient load-carrying quality of these tubes to provide the necessary cushioning effect for my tire, and thereby avoid the use of air under compression, my tubes being filled with air at atmospheric pressure and provided with air openings to afford circulation of air both through and around the tubes. The particularly novel feature of my improved tire consists in the use of four tubes and their particular arrangement relative to one another and their disposition in the tire. These tubes are of the same diameter and they are so assembled that two tubes have their diameters in line with the diameter of the wheel and are spaced from one another and the two remaining tubes are spaced equi-distantly on each side of the diameter of the wheel and have their peripheries tangent to the peripheries of the other two tubes, thus holding them apart. This peculiar arrangement of the tubes secures an advantageous distribution of strain through the several tubes when the tire is subjected to pressure in use. It is obvious that the deforming pressure imposed by the load carried by the tire will affect the uppermost tube but will be transmitted through the two side tubes to the lowermost tube. It will be seen, therefore, that the load is carried upon all four of the tubes.

The drawing illustrates one embodiment of my invention but its scope is not limited to the disclosure of said drawing but is defined by the claim appended hereto.

The drawing is a vertical section through a tire equipped with my invention.

My improved tire comprises four tubular members A, B, C and D, made of ordinary air hose which is four-ply having four layers of rubber $r$ and four layers of fabric $f$. I arrange these four members in juxtaposition in such a way that the tube A is at the inner face of the tire and the tube C at the outer face of the tire and the tubes B and D at either side of the tire. I surround these tubes with a suitable fabric covering E and when they are so enclosed there are formed five air chambers F, G, H, I and J, about the tubes. I surround the fabric E with a rubber covering K which forms a tubular inner tire which is received inside the ordinary outer tire L, which may be attached in the usual way to the rim of a vehicle wheel.

In order to permit the circulation of air both within and about the tubes A, B, C and D, I provide air openings A', A', A', B', B', C', C', and D', D'. I also provide the tube A with an air pipe O which passes through the rim of the wheel to which my tire is attached and is open to the atmosphere. The foregoing series of air openings affords means for circulation of air through the tubes A, B, C and D and the air chambers F, G, H, I and J.

Having described my invention, what I claim is:

In a vehicle tire, the combination of a covering; four tubes composed of alternate layers of rubber and fabric, and disposed within said covering so that two of said tubes have their medial planes in line with the medial plane of the tire and spaced apart, and the other two remaining tubes are spaced apart equi-distantly on each side of the medial plane of the tire and have the periphery of each tangent to the peripheries of the first mentioned two tubes, said tubes being so related to one another and the said covering as to provide air spaces between portions of the sides of the tubes and the covering; an air port provided in each of said tubes, said ports affording inter-communication between the interior of said tubes and said air spaces; and an air vent provided in one of said tubes in communication with the atmosphere.

In testimony whereof I affix my signature.

CHARLES A. WOLFE.